United States Patent
Talmor

(10) Patent No.: US 9,477,768 B1
(45) Date of Patent: *Oct. 25, 2016

(54) DISAMBIGUATION OF ONLINE SOCIAL MENTIONS

(71) Applicant: salesforce.com, inc., San Francisco, CA (US)

(72) Inventor: Alon Talmor, Tel Aviv (IL)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,659

(22) Filed: Jun. 29, 2015

Related U.S. Application Data

(63) Continuation of application No. 13/842,621, filed on Mar. 15, 2013, now Pat. No. 9,069,858.

(60) Provisional application No. 61/702,551, filed on Sep. 18, 2012.

(51) Int. Cl.
*G06F 17/30* (2006.01)

(52) U.S. Cl.
CPC ... *G06F 17/30867* (2013.01); *G06F 17/30395* (2013.01); *G06F 17/30528* (2013.01); *G06F 17/30604* (2013.01)

(58) Field of Classification Search
USPC ........ 707/608, 687, 706, 791, 828, 821, 953
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

OTHER PUBLICATIONS

Singh, Sameer, et al., "Large-Scale Cross-Document Coreference Using Distributed Inference and Hierarchical Models," Department of Computer Science, University of Massachusettes, Copyright Jun. 2011, 11 pages.

*Primary Examiner* — Sana Al Hashemi

(74) *Attorney, Agent, or Firm* — Haynes Beffel & Wolfeld LLP; Ernest J. Beffel, Jr.

(57) ABSTRACT

The technology disclosed relates to identifying entity reflections that refer to a same real-world entity. In particular, it relates to using statistical functions to make probabilistic deductions about entity attributes, which are used to construct optimal combinations of entity attributes. These optimal combinations of entity attributes are further used to generate search queries that return more precise search results with greater recall.

20 Claims, 7 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0109445 A1* | 5/2008 | Williams ............... G06Q 30/00 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2014/0074928 A1* | 3/2014 | B'Far ................... H04L 67/306 709/204 |
| 2014/0080428 A1* | 3/2014 | Rhoads ............. G06F 17/30241 455/88 |

* cited by examiner

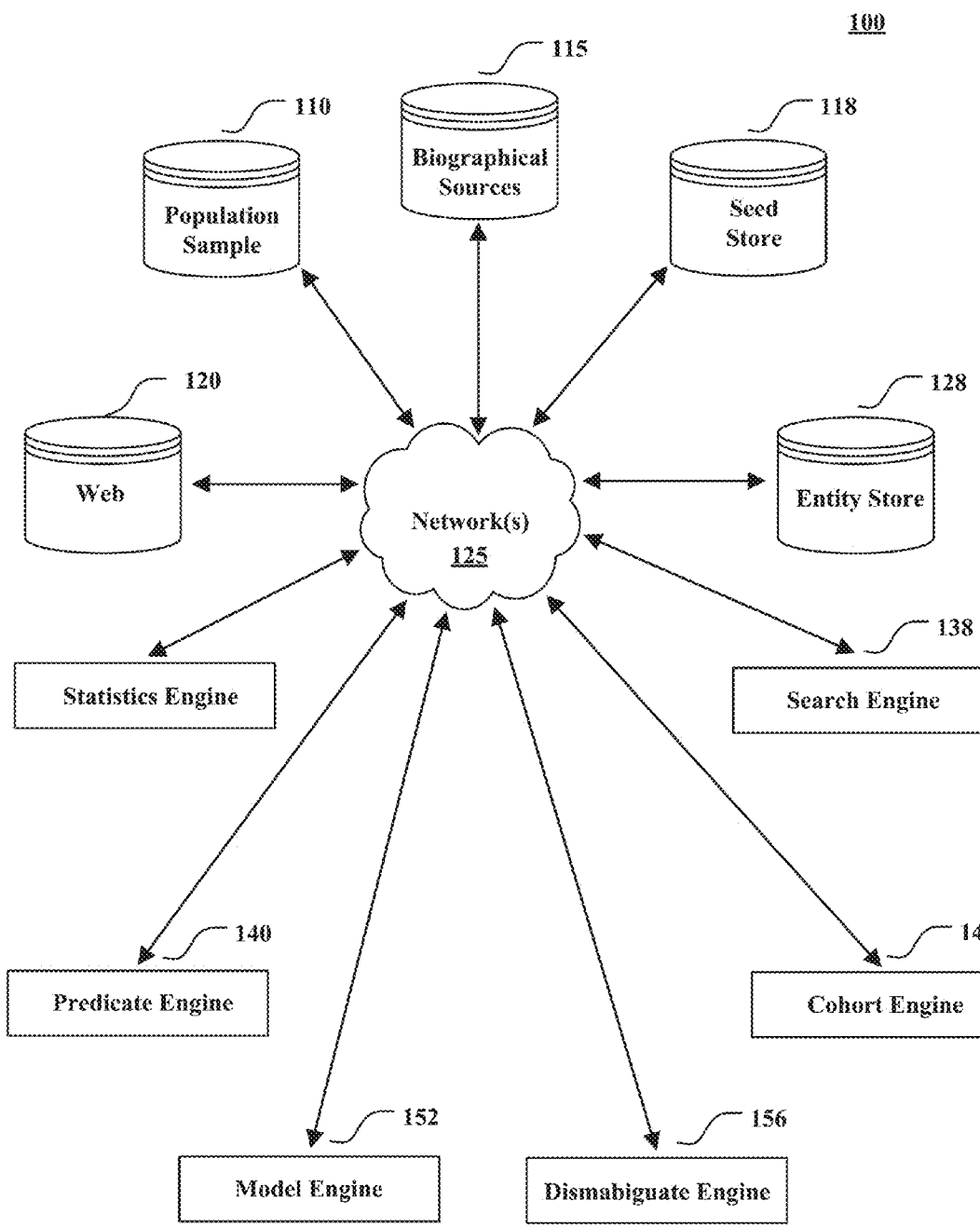
Fig. 1 – Entity Identification Framework

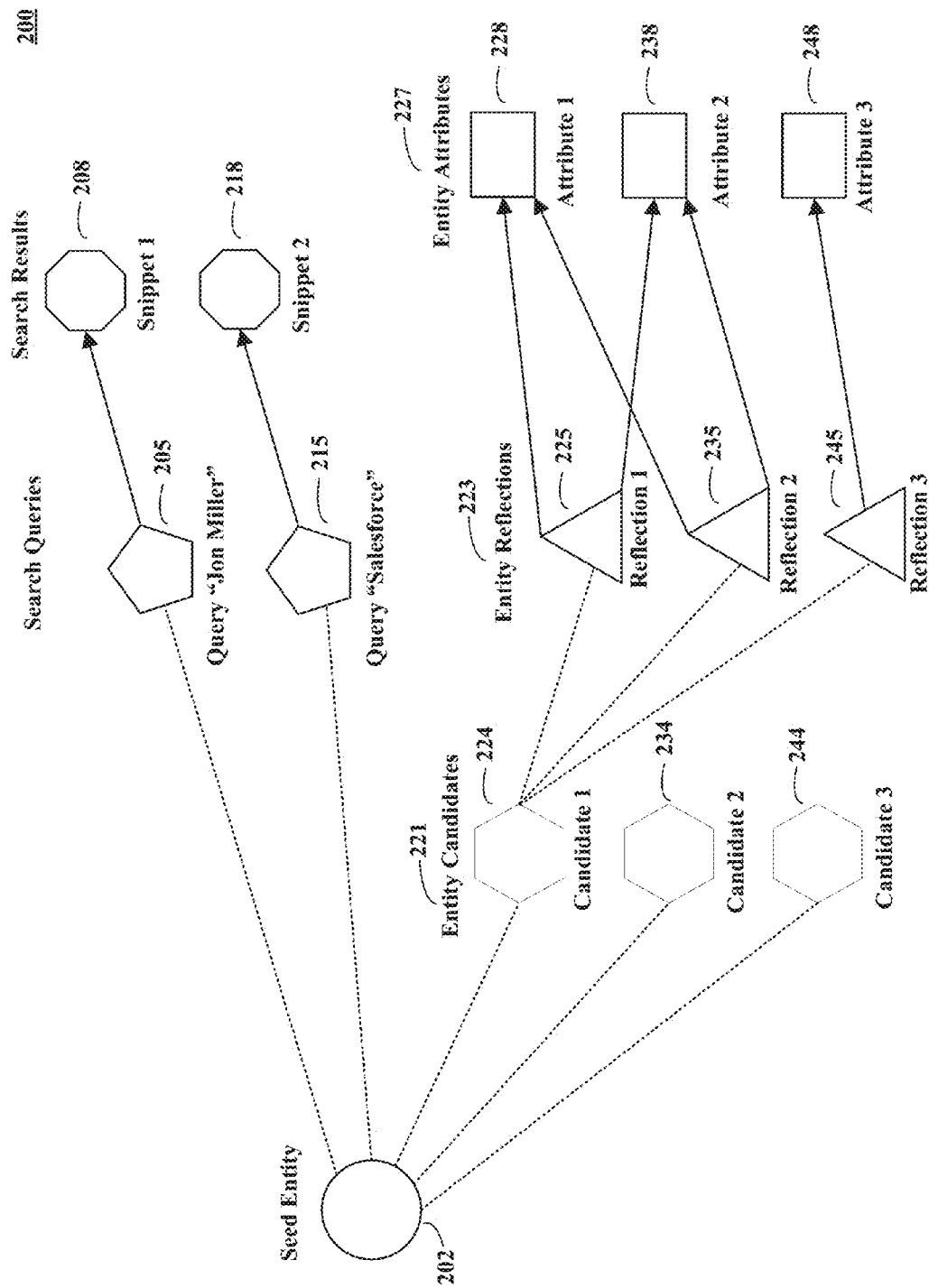
Fig. 2 – Entity Identification Model

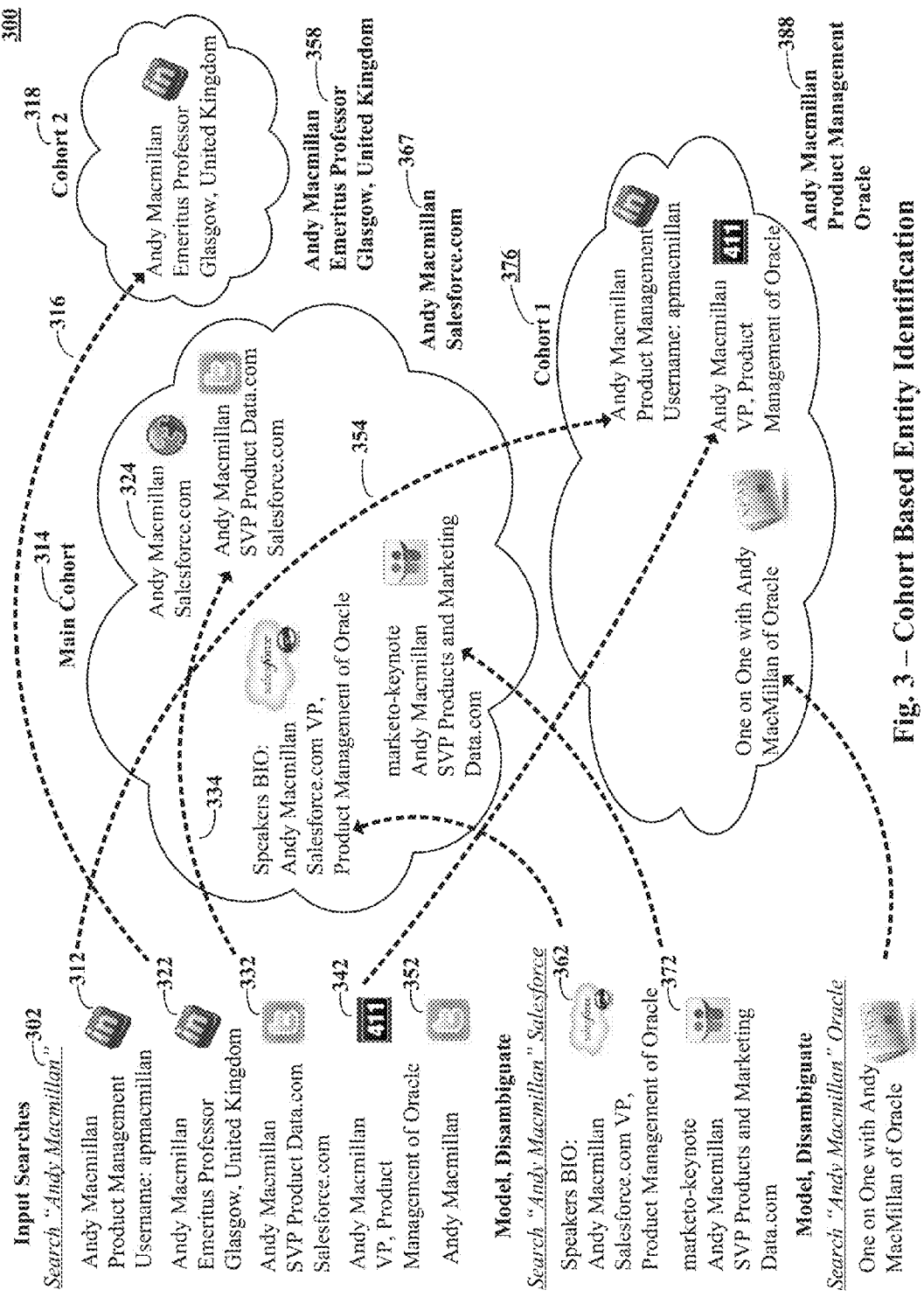
Fig. 3 – Cohort Based Entity Identification

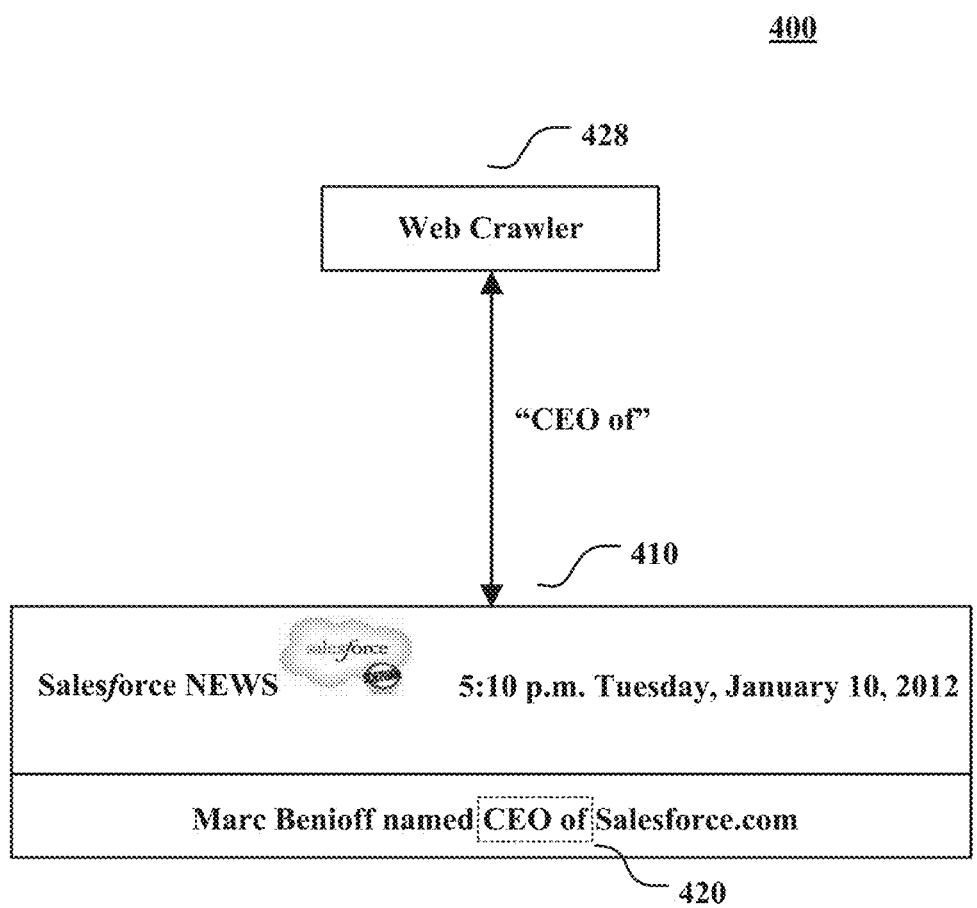
Fig. 4 – Predicate Analysis

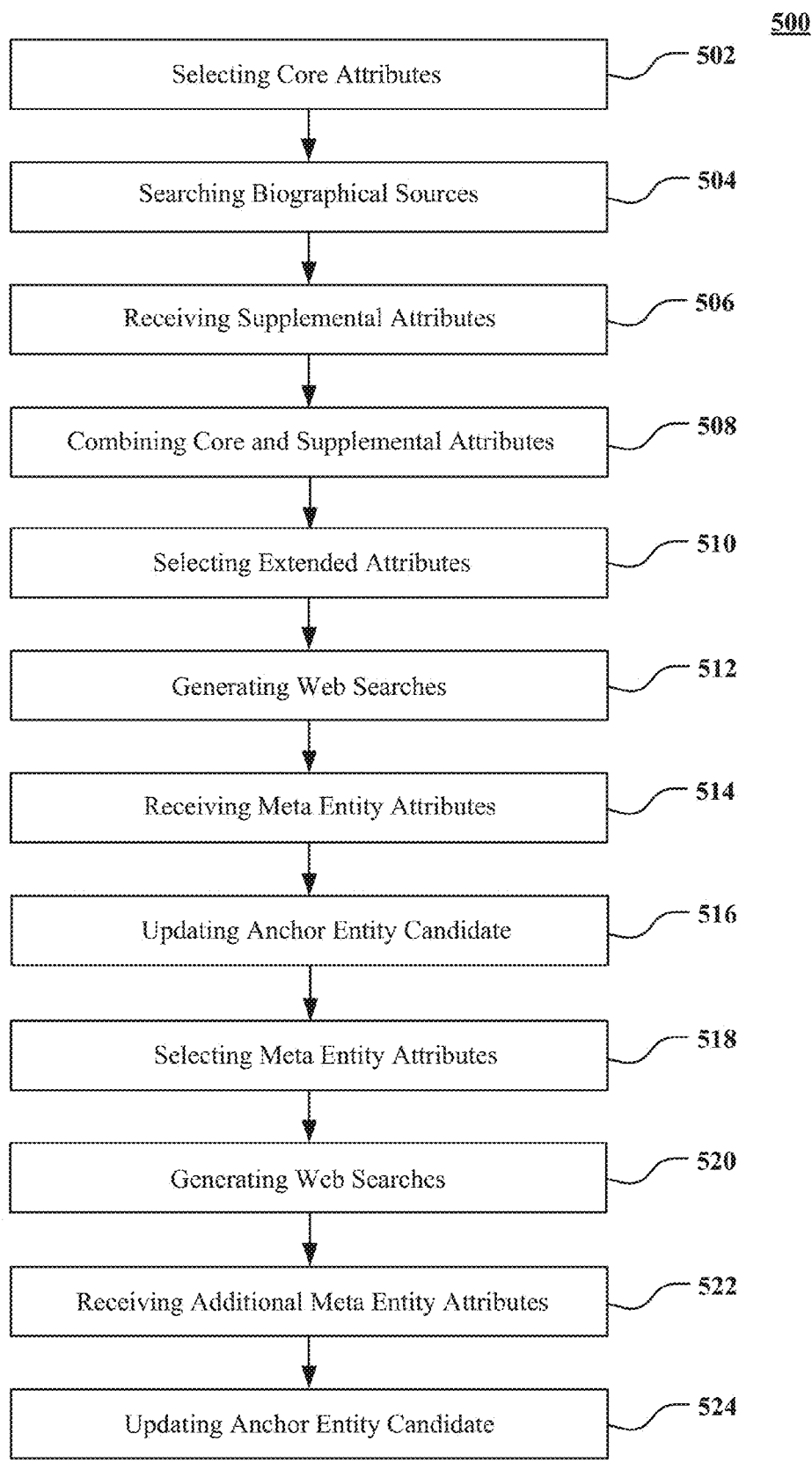
Fig. 5 – Entity Identification

Entity

Name: John Smith
Title: CTO
Email: jsmith@sf.com
Phone: 415-608-3356

Abstract
John Smith has been working with virtual machines since 2006. John has worked in variety of sectors including digital media, information services, and the Software-as-a-Service sector. John is a member of IEEE. John has 12 years of experience processing. John started his career at BlueTail as database engineer, working with abstract data objects SQL. He is a native Californian, born and raised in Palo Alto. John loves sailing and golfing.

Web Presence:

4 Connections | 31 Nuggets | Search: *John Smith Salesforce*

John Smith — Our Team
*John Smith* has over 12 years of operating and investing experience in the NY technology community. He spent the first…..more

Dreamforce'12
*John Smith* spoke at the Masonic Center. He introduced Social …..more

New York City Next
Marc Benioff, Salesforce's CEO, *John Smith*, Salesforce's CTO …..more

Bio
*John Smith* joined Salesforce in 2007. Previously, he was at …..more

John Smith
US open outing w family. Wozniacki, Federer, and Serena on roster today. Beautiful day for tennis!

Tennis
*@johnsmith*….finals match — both Djokovic and Nadal played superbly. Djokovic is true champ…more

SF — John Smith
SF —*John Smith*, Salesforce, Inc …..more

Album
*John Smith's* Pictures

Fig. 6 – User Interface

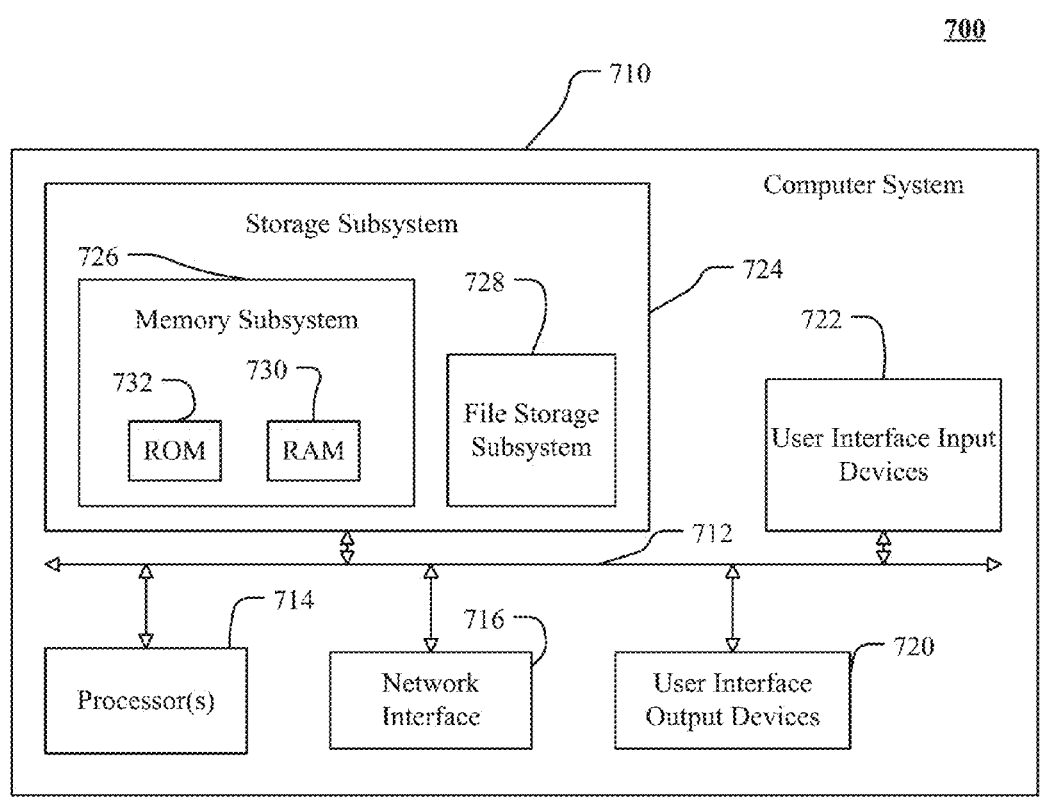
Fig. 7 – Computer System

DISAMBIGUATION OF ONLINE SOCIAL MENTIONS

RELATED APPLICATION

The present application is a continuation of and claims priority under 35 U.S.C. §120 to U.S. patent application Ser. No. 13/842,621 entitled "SYSTEMS AND METHODS FOR IDENTIFYING ENTITY MENTIONS REFERENCING A SAME REAL-WORLD ENTITY", filed Mar. 15, 2013, which claims priority under 35 U.S.C. §119(e) from U.S. Provisional Patent Application No. 61/702,551, entitled, "SYSTEMS AND METHODS FOR CREATING SOCIAL PROFILES AND ANALYZING DATA", filed on Sep. 18, 2012, the entire disclosures of which are incorporated herein by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to identifying entity reflections that refer to a same real-world entity. In particular, it relates to using statistical functions to make probabilistic deductions about entity attributes, which are used to construct optimal combinations of entity attributes. These optimal combinations of entity attributes are further used to generate search queries that return more precise search results with greater recall.

In this era of large electronic environments, where each individual is a social profile or business-to-business contact, there is an ever-increasing need of personalized tools that can gather credible information about individuals. For instance, news articles containing myriad information about individuals, do not provide users the tools to identify whether certain new articles belong to the individual in question or to another individual with the same name.

Accordingly, it is desirable to provide systems and methods that offer a flexible approach to identifying entity mentions that refer to a same real-world entity. An opportunity arises to provide users personalized tools that will allow them to identify whether or not a web mention or database profile belongs to a particular individual. Enhanced user experience and increased user satisfaction may result.

SUMMARY

The technology disclosed relates to identifying entity reflections that refer to a same real-world entity. In particular, it relates to using statistical functions to make probabilistic deductions about entity attributes, which are used to construct optimal combinations of entity attributes. These optimal combinations of entity attributes are further used to generate search queries that return more precise search results with greater recall.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows a block diagram of one implementation of an entity identification framework.

FIG. 2 illustrates one implementation of an entity identification model.

FIG. 3 illustrates one implementation of cohort based entity identification.

FIG. 4 shows a block diagram of one implementation of predicate based entity identification.

FIG. 5 shows a flow chart of entity identification using the innovative method.

FIG. 6 illustrates one implementation of a user interface for searching entity mentions referencing a same real-world entity.

FIG. 7 is a block diagram of an example computer system for entity identification.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to construction of statistical datasets by applying statistical functions such as joint probability distribution, probability density norm and probability distribution contribution over attributes of entities, where the entities can be individuals, groups, organizations, etc. in a population sample. The attributes of entities can include names, phone numbers and addresses of the individuals, groups, organizations, etc.

Entity candidates can be defined as entity instances with highest similarity to a real-world entity. In some implementations, the first entity instance of a real-world entity can be referred as "anchor entity candidate."

Entity reflections can be defined as web or database profiles or mentions of a real-world entity in biographical sources and/or web. Examples of entity reflections can include social profiles, social handles, unified resource locators (URLs), business-to-business contacts, etc. The terms "entity reflections" and "entity mentions" are interchangeably used in this application.

In some implementations, entity reflections can be assigned reference scores or "ref_score" that represent the overall relation of an entity reflection to a real-world entity. The "ref_score" can be calculated using a probability distribution contribution function described later in this application.

Entity attributes can represent properties or characteristics of a real-world entity such as an entity's name, address, job title, usernames, contact information, employer name etc. In some implementations, entity attributes can be associated to entity candidates and/or entity reflections.

In some implementations, entity attributes can be assigned attribute scores or "att_score" that specify the overall similarity of an attribute to a real-world entity. The "ref_score" can be calculated using a probability distribution contribution function described later in this application.

Entity attributes can be of different types including core attributes, supplemental attributes and meta attributes depending on the query count. Core entity attributes can be defined as entity attributes that are used to issue a first query. The attributes that returned from the search results generated from the first query are referred as supplemental attributes. Furthermore, all entity attributes extracted from search results received in response to subsequent queries are categorized as meta attributes.

Joint probability distribution can estimate the size of a resulting entity population by defining a function of the n attributes. For any domain D in the n-dimensional space of the values of the attributes $X_1, \ldots X_N$, the probability that entity that consists of a realization of the set attributes falls inside the domain D can be as follows:

$$Pr(X_1, \ldots, X_N \in D) = \int_D f_{X1,\ldots Xn}(x_1, \ldots x_n) dx_1, \ldots dx_N$$

In some implementations, the probability that entity that consists of a realization of an independent set of attributes which do not fall inside any domain can be as follows:

$$f_{X1,\ldots,Xn}(x_1, \ldots x_n) = f_{X1}(x_1) \ldots f_{Xn}(x_n)$$

Entity reflections can be compared using a probability density norm. For any domain D in the n-dimensional space of the values of the attributes $X_1, \ldots X_N$, the probability that first entity reflection ($R_1$) and second entity reflection ($R_2$) that consist of a realization of the set attributes fall inside the domain D can be as follows:

$$D(R_1, R_2) = f_{X1,\ldots Xn \in R_1, R_2}(X_1, \ldots X_n) - \Sigma_k p(att_{R_2}{}^k \neq att_{R_1}{}^k)$$

In some implementations, a natural threshold that is equivalent to the inverse of the estimated entity population can be defined. Entity reflections $R_1$ and $R_2$ in domain D can refer to the same real-world entity if the probability density norm $D(R_1, R_2)$ is less than the natural threshold. This can be mathematically summarized as:

$$D(R_1, R_2) > \frac{1}{EstEntityPopulation}$$

Entity reflections can be matched using a probability density contribution function (PDC), which is defined as the marginal contribution of a specific attribute to the overall joint probability of its associated entity reflection. For instance, PDC for an attribute of type "name" can be lower than the PDC for an attribute of type "e-mail", because unlike an e-mail, a name can belong to several individuals.

In some implementations, entity reflections i and j can be compared based on attributes of type q and attribute scores greater than a set threshold. The resulting matches can be sorted by applying the PDC function. For each sorted match, an attribute score can be calculated using the following formula, where $Score_{initial}$ can be the previously calculated PDC of an attribute of type q and $arg\ max_j P(att_i|att_j)$ can be the maximum dependency probability between $attribute_i$ and $attribute_j$. The attribute score can be calculated as:

$$Score_{total} = Score_{initial} + pdc(match_q^{i,j}) \cdot argmax_j P(att_i | att_j))$$

For example, entity reflections John Miller and Jon Miller can have the same value "Salesforce" for their respective core attributes of type "employer name." As numerous individuals can work for the same employer, the core attribute has a low attribute score of 0.3. For a threshold set to 1.1, the core attributes are not enough to compare the entity reflections.

Furthermore, a first entity named "John Miller" and a second entity named "Jon Miller" can have the same values "jmiller@salesforce.com" and "jmiller" for the meta attribute types "email" and "username." Since, attribute types "email" and "username" are specific to an individual, the meta attributes each have high attribute scores of 0.9.

In some implementations, the technology disclosed can append the core attribute with any one of the meta attribute to attain a total score of 2.0 and issue queries that generate search results with high precision and great recall. In other implementations, the technology disclosed can append all three attributes to attain a total score of 2.1 and issue queries that generate search results with higher precision and greater recall. This can be mathematically summarized as:

PDC(EmployerName)<Threshold

PDC(E-mail,Username)>Threshold

In some implementations, the technology disclosed can disambiguate entity reflections using a cohorting framework that splits entity reflections into cohorts. The most similar entity reflections can be placed in a "main cohort", while other cohorts can include less similar entity reflections.

The PDC function described above can be applied to each cohort to calculate the attribute scores for the attributes of the entity reflections. Following this, the top n attributes with highest attribute scores can be merged to create a new entity reflection referred to as "anchor entity reflection." Following this, anchor entity reflections can be created for each of the cohort.

Using the entity comparison method described above, the anchor entity reflection of the main cohort can be compared to the anchor entity reflections of other cohorts based on their respective top n attributes. In case of a match, the main cohort can be consolidated with the other cohort and the entity reflections within the consolidated cohort can be considered to refer to the same real-world entity.

The technology disclosed relates to entity identification for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Entity Identification Architecture

FIG. 1 shows a block diagram of one implementation of an entity identification framework 100. FIG. 1 shows that framework 100 can include population sample 110, biographical sources 115, seed store 118, web 120, network 125, entity store 128, statistics engine 130, search engine 138, predicate engine 140, cohort engine 148, model engine 152, and disambiguate engine 156. In other implementations, framework 100 may not have the same components as those listed above and/or may have other/different components instead of, or in addition to, those listed above.

Population sample 110 can be a subset including relevant data from a large data set. For instance, a list of employees of a particular company in a given country can be extracted from a larger database of all the employees of all the companies in that country and further included in the population sample 110. In some implementations, population sample 110 can be used both in the preprocessing and final steps of entity identification. In other implementations, population sample 110 can be used to create training and testing datasets.

Biographical sources 115 can include various person-related data sources such as: access controlled application-programming interfaces (APIs) like Yahoo Boss, Facebook Open Graph, Twitter Firehose; public internet including blogs, first hand website; and/or social networking sites like Twitter, Facebook, LinkedIn, Klout etc.

Seed store 118 can include entity seeds that are collections of core entity attributes define above in this application. In some implementations, a seed can be an entity profile provided by a database directory service such as Jigsaw®.

Web 120 can be a system of interlinked hypertext documents that can be accessed via the network 125 (e.g., the Internet). Entity store 128 can include real-world entities and entity mentions, which can be processed in engines 130, 138, 140, 148, 152, and/or 156 of the framework 100.

Statistics engine 130 can apply statistical functions such as probability distribution functions or joint probability distribution on the population sample 110 to make statistical deductions based on entity attributes.

Search engine 138 can provide text indexing and other search functionalities including using a web crawler for crawling the web 120 to extract entity reflections. In some implementations, search engine 138 can issue queries on the biographical sources 115 based on the entity attributes.

Predicate engine 140 can extract entity reflections from the web 120 based on affix schemas by using a combination of predicate lookups and regular expressions that provide faster and more precise search results. In one example, predicate engine 140 can differentiate between a group of numbers "213 21 89 10 76" and a phone number "Telephone: 213 21 89 10 76."

Model engine 152 can apply the probability density contribution (PDC) function on the extracted entity reflections. It can also calculate the attribute scores for entity attributes based on the PDC. For instance, a PDC of specific company name can be its attribute type of "company size". This can be mathematically summarized as:

$$PDC(\text{'Salesforce.com'}) \sim 3000.s$$

In some implementations, model engine 152 can merge the top n attributes with highest attribute sores of a group of entity reflections to create anchor entity reflections. An anchor entity reflection can be defined as the representative entity reflection for all the entity reflections included in a cohort.

Cohort engine 148 can categorize entity reflections into cohorts based on attribute scores. In some implementations, it can apply a threshold based classification on the entity reflections, which is described later in this application.

Disambiguate engine 156 can compare the anchor entity reflections created by the model engine 152 based on the entity matching algorithms described above in this application. It can further consolidate the cohorts that have matching anchor entity reflections.

Entity Identification Model

FIG. 2 illustrates one implementation of entity identification model 200. FIG. 2 shows that model 200 can include seed entity 202, search queries 205 and 215, search results 208 and 218, entity candidates 221, entity reflections 223, and entity attributes 227. In other implementations, model 200 may not have the same entity variants as those listed above and/or may have other/different entity variants instead of, or in addition to, those listed above.

Seed entity 202 can include one or more core attributes of a real-world entity such as name, job title, employer's name, contact information, employer name, etc. Search query 205 can include the name "Jon Miller" of the real-world entity and can be issued on the biographical sources 115 to generate search result 208 in the form of snippet one. Similarly, search query 215 can include the employer name "Salesforce" of the real-world entity and can be issued on the biographical sources 115 to generate search result 218 in the form of snippet two.

Entity candidates 221 can be associated with entity reflections 223 and entity attributes 227, which can be extracted from search results 208 and 218. After generating search queries based on core attributes, model 200 can receive three entity candidates 224, 234 and 244. Anchor entity candidate 224 can be an individual named "Jon Miller" with entity reelections 225, 235 and 245. Entity refection 225 can be John Miller's Twitter profile with entity attributes 228 and 238 that represent his Twitter username "jmiller" and job title "accountant." Entity refection 235 can be a news URL that includes the same entity attributes 238 and 238 as does entity reflection 225. Entity refection 235 can be a company executive URL with entity attribute 248, which represents an e-mail "jmiller@salesforce.com."

Applying the joint probability distribution algorithm described above, statistics engine 130 can calculate the likelihood of an individual named "Jon Miller" working for a company named "Salesforce." Model engine 152 can then use the reference scores of entity reflections 225 and 235 to identify that they are associated to the same anchor entity candidate 224. It can further use the attribute scores of entity attributes 228 and 238 to identify that they are associated to entity reflections 225 and 235.

As a result, entity attributes 228 and 238 can be considered to be associated with anchor entity candidate 224. This adds two new attributes to the seed entity 202, "jmiller" and job title "accountant.", that can be used for further searches to provide more precise results with less recall.

Cohort Based Entity Identification

FIG. 3 illustrates one implementation of cohort based entity identification 300. FIG. 3 includes main cohort 314, primary cohort 376 and secondary cohort 318. In other implementations, entity identification 300 may not have the same cohorts as those listed above and/or may have other/different cohorts instead of, or in addition to, those listed above.

In some implementations, search engine 138 can issue queries on biographical sources 115 using seed entity 324 that includes attributes values "Andy Macmillan" and "Salesforce.com." The cohort engine 148 can then apply a threshold based classification on the entity reflections received from the search results. Entity reflections with attributes that have attribute scores above an upper threshold can be placed in main cohort 314 that includes entity reflections with most similarity to seed entity 324. Entity reflections with attribute scores below a lower threshold can be placed in secondary cohort 318, which includes entity reflections that are least similar to seed entity 324. Finally, entity reflections with attribute scores between the upper and lower threshold can be included in primary cohort 376.

Furthermore, searching "Andy Macmillan" at step 302 can generate five different entity reflections 312-352 from various biographical sources such as LinkedIn and Twitter that have same value for attribute of type "name" but different values for the supplemental attributes like job title, address, etc. The cohort engine 148 can then apply the threshold classification on the entity reflections 312-352 and place them in the appropriate cohorts 314, 376 or 318.

In one example, entity reflection 322 can be placed in secondary cohort 318 at step 316, whereas entity reflection 312 can be placed in primary cohort 376 at step 354 because attribute value "Product Management" of entity reflection 312 matches the attribute value "Salesforce" of the seed entity 324 more than does the attribute value "Emeritus Professor" value of entity reflection 322.

In another example, entity reflection 332 can be placed in main cohort 314 at step 334 because it has the same attribute value "Salesforce" as that of the seed entity 324. Contrarily, entity reflection 352 may not be assigned to any of the cohorts 314, 376 or 318 as it lacks any supplemental attributes.

The model engine 152 can merge the top n attributes with highest attribute scores for all the entity reflections to create anchor entity reflections 367, 388 and 358 for each of the respective cohorts 314, 376 and 318. For example, the anchor entity reflection 336 includes attribute values "product management" and "oracle" instead of "apmacmillan", because the seed entity 324 does not include an attribute of type "username."

The disambiguate engine 156 can compare the anchor entity reflections 324, 332, 362, and 372 of the main cohort 324 with anchor entity reflections 388 and 358 of the primary and secondary cohorts 376 and 318 using the entity comparison algorithms described above in this application. In case of a single match, main cohort 314 can be consolidated with one of the primary cohort 376 or secondary cohort 318. In case of multiple matches, main cohort 314 can be consolidated with both the primary cohort 376 and secondary cohort 318. As a result, the entity reflections of the consolidated cohort can be considered to reference the same real-world entity.

Predicate Analysis

FIG. 4 illustrates one implementation of entity identification 400 using predicate analysis. FIG. 4 shows that entity identification 400 can include a web crawler 428 that crawls the web 120 to generate a predicate result set by using predicate analysis based on affix schemas with predetermined context words before and after entity reflections.

The predicate engine 140 can use one or more of the core, supplemental, search attribute to generate one or more searches for processing against the predicate result set and receive entity reflections from searching the predicate results set that include predicated entity attributes for real-world entity. It can further update the anchor entity candidate to include one or more of the predicated entity attributes.

In one example, the web crawler 428 can generate a predicate result set in the form of entity reflection 410. The predicate result set can be based on an affix schema with pre-defined context word "CEO of" 420. As a result, the web crawler 428 can extract entity attribute "Marc Benioff" and "Salesforce.com" before and after entity the entity reflection 410.

In some implementations, the new extracted entity attributes can serve as core, supplemental or meta attributes for receiving search results with higher precision and lower recall.

Flow-Chart

FIG. 5 shows a flow chart 500 of entity identification using the innovative method. Other implementations may have the same blocks in different orders and/or with different or additional blocks than the ones illustrated in FIG. 5. For convenience, this flow-chart is described with reference to the system that carries out a method. The system is not necessarily part of the method.

One or more core entity attributes that represent a real-world entity are selected as a first search attribute set at block 502 for use in searching biographical sources 115. In some implementations, the selection includes applying one or more probability distribution functions or joint probability distribution functions described above to estimate resulting cohort size.

Search engine 138 generates one or more searches based on the first search attribute set at block 504 for processing by a plurality of biographical sources 115 such as Facebook, LinkedIn, Twitter, etc.

Entity reflections that include supplemental entity attributes for the real-world entity are electronically received at block 506 and stored in entity store 128.

At block 508, the core attributes and supplemental attributes are combined cohort engine 148 in an anchor entity candidate data object with extended entity attributes that represent the real-world entity.

One or more extended entity attributes are selected as a second search attribute set at block 510 for use in searching web sources 120. In some implementations, the selection includes applying one or more probability distribution functions or joint probability distribution functions described above to estimate resulting cohort size.

Search engine 138 generates one or more further web searches based on the second search attribute set at block 512 for processing by web sources 120.

Entity reflections that include meta entity attributes for the real-world entity are electronically received at block 514 and stored in entity store 128.

At block 516, the anchor entity candidate is updated to include one or more of the meta entity attributes.

One or more meta entity attributes are selected as a third search attribute set at block 518 for use in searching web sources 120. In some implementations, the selection includes applying one or more probability distribution functions or joint probability distribution functions described above to estimate resulting cohort size.

Search engine 138 generates one or more further web searches based on the third search attribute set at block 520 for processing by web sources 120.

Entity reflections that include additional meta entity attributes for the real-world entity are electronically received at block 522 and stored in entity store 128.

At block 524, the anchor entity candidate is updated to include one or more of the additional entity attributes.

User Interface

FIG. 6 illustrates one implementation of a user interface 600 for searching entity mentions referencing a same real-world entity. FIG. 6 shows that user interface 600 referred as "Salesforce Entity" can provide an interface or dashboard for users to search biographical sources 115 and/or web 120 for entity reflections that reference a same real-world entity. In other implementations, the user interface 600 can take one of a number of forms, including a dashboard interface, an engagement console, and other interfaces, such as a mobile interface or summary interface.

In some implementations, user interface 600 can include a widget 604 that specifies common social connections between the user and the real-world entity. In other implementation, it can include a widget 606, which specifies total number of entity reflections or "nuggets" the real-world entity has on the searched sources.

In some implementations, users can type entity attributes in the search bar 608 and receive entity reflections from various biographical sources 115 and/or web 120 in the form of multiple screen objects on a single screen.

In some implementations, the user interface 600 can also generate a user profile 603 with an abstract 602 in response to a search. In other implementations, users can receive a summary 640 of the real-world entity's web presence, which is enhanced by a display of icons of the corresponding sources.

In one example, a user can search a real-world entity named "John Smith" on the search bar 608 and in response receive thirty-one nuggets that can be specified via widget 606. The user interface 600 can display John Smith's entity reflections supplied Twitter, Facebook, etc. in the form of screen objects 611, 621, 631, 641, 612, 622, 632, and 642. It can also generate John Smith's social profile 603 with an abstract 602 and further provide a summary of his web presence on LinkedIn, YouTube, etc. using screen object 640.

Computer System

FIG. 7 is a block diagram of an example computer system 700 for entity identification. FIG. 7 is a block diagram of an example computer system, according to one implementation. Computer system 710 typically includes at least one processor 714 that communicates with a number of peripheral devices via bus subsystem 712. These peripheral devices may include a storage subsystem 724 including, for example, memory devices and a file storage subsystem, user interface input devices 722, user interface output devices 720, and a network interface subsystem 716. The input and output devices allow user interaction with computer system 710. Network interface subsystem 716 provides an interface to outside networks, including an interface to corresponding interface devices in other computer systems.

User interface input devices 722 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 710.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules and methods described herein. These software modules are generally executed by processor 714 alone or in combination with other processors.

Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as one example. Many other configurations of computer system 710 are possible having more or fewer components than the computer system depicted in FIG. 7.

Some Particular Implementations

The technology disclosed may be practiced as a method or system adapted to practice the method.

In one implementation, a method is described for identifying entity mentions referencing a same real-world entity. The method includes selecting one or more core entity attributes that represent a real-world entity as a first search attribute set for use in searching biographical sources, including in the selection applying one or more probability distribution functions or joint probability distribution functions to estimate resulting cohort size.

The method further includes generating one or more searches for processing by a plurality of biographical sources using the first search attribute set, electronically receiving, responsive to the first search attribute set, entity reflections that include supplemental entity attributes for the real-world entity, combining the core and supplemental attributes in an anchor entity candidate data object with extended entity attributes that represent the real-world entity, selecting one or more extended entity attributes as a second search attribute set for use in searching web sources, including applying one or more further probability distribution functions or joint probability distribution functions to estimate resulting cohort size, generating one or more further web searches using the second search attribute set, electronically receiving, responsive to the second search attribute set, more entity reflections that include meta entity attributes for the real-world entity, and updating the anchor entity candidate to include one or more of the meta entity attributes.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method further includes selecting one or more meta entity attributes from the further web searches to include in a third search attribute set, including applying one or more additional probability distribution functions or joint probability distribution functions to estimate resulting cohort size, generating one or more additional searches including the meta entity attributes in the third search attribute set, electronically receiving, responsive to the third search attribute set, additional entity reflections that include additional meta entity attributes, and updating the anchor entity candidate to include one or more of the additional entity attributes.

The method further includes at least some of the entity reflections representing one or more web mentions or web profiles of the real-world entity. It further includes using an entity seed that includes one or more core entity attributes to search across the biographical sources.

The method further includes using an entity profile from a primary biographical source that includes the core entity attributes selected as the first search attribute set used to search the plurality of biographical sources.

The method further includes generating a set of predicate results from one or more web crawls using predicate analysis based on affix schemas with predetermined context words before and after entity mentions, using one or more of the first, second or third search attribute sets to generate one or more searches for processing against the predicate results set, electronically receiving entity reflections from searching the predicate results set that include predicated entity attributes for the real-world entity, and updating the anchor entity candidate to include one or more of the predicated entity attributes.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described for connecting entity reflections to real-world entities in an ambiguous environment. The method includes selecting one or more core entity attributes that represent a real-world entity as a first search attribute set for use in searching biographical sources, including in the selection applying one or more probability distribution functions or joint probability distribution functions to estimate resulting cohort size, generating one or more searches for processing by a plurality of biographical sources using the first search attribute set, electronically receiving, responsive to the first search attribute set, entity reflections that include supplemental entity attributes for the real-world entity, calculating attribute scores for supplemental attributes using a probability contribution function, wherein the attribute scores specify a quantitative assessment of similarity between the supplemental attributes and the core attributes, and merging supplemental attributes with attributes scores above a predefined threshold with core attributes in an anchor entity candidate data object with extended entity attributes that represent the real-world entity, The method further includes selecting one or more extended entity attributes as a second search attribute set for use in searching web sources, including applying one or more further probability distribution functions or joint probability distribution functions to estimate resulting cohort size, generating one or more further web searches using the second search attribute set, electronically receiving, responsive to the second search attribute set, more entity reflections that include meta entity attributes for the real-world entity, calculating attribute scores for meta entity attributes using a probability contribution function, wherein the attribute scores specify a quantitative assessment of similarity between the meta entity attributes and the extended entity attributes, and updating the anchor entity candidate to include one or more of the meta entity attributes with attribute scores above the predefined threshold.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method further includes selecting one or more meta entity attributes from the further web searches to include in a third search attribute set, including applying one or more additional probability distribution functions or joint probability distribution functions to estimate resulting cohort size, generating one or more additional searches including the meta entity attributes in the third search attribute set, electronically receiving, responsive to the third search attribute set, additional entity reflections that include additional meta entity attributes, calculating attribute scores for additional meta entity attributes using a probability contribution function, wherein the attribute scores specify a quantitative assessment of similarity between the additional meta entity attributes and meta entity attributes, and updating the anchor entity candidate to include one or more of the additional entity attributes with attribute scores above the predefined threshold.

The method further includes applying a threshold based classification to one or more of the first, second or third search attribute sets. It further includes clustering attributes with attribute scores above an upper threshold in a main cohort, clustering attributes with attribute scores below a lower threshold in a secondary cohort and clustering attributes with attribute scores between the upper and lower classification thresholds in a primary cohort.

The method further includes merging the attributes with highest attribute scores within the primary and secondary cohorts to create anchor entity reflections for the primary and secondary cohorts, matching the anchor entity reflections of the primary and secondary cohorts to the entity reflections within the main cohort, including in the matching applying probability contribution function to compare attribute scores, creating an anchor cohort by consolidating one or more matched cohorts with the main cohort, and searching further based on the anchor cohort to find matches or near matches to the real-world entity.

The method further includes the attribute scores specifying overall similarity of an attribute to the real-world entity. It further includes at least some of the entity reflections represent one or more web mentions or web profiles of the real-world entity. It further includes using an entity seed that includes one or more core entity attributes to search across the biographical sources.

The method further includes using an entity profile from a primary biographical source that includes the core entity attributes selected as the first search attribute set used to search the plurality of biographical sources.

The method further includes generating a set of predicate results from one or more web crawls using predicate analysis based on affix schemas with predetermined context words before and after entity mentions, using one or more of the first, second or third search attribute sets to generate one or more searches for processing against the predicate results set, electronically receiving entity reflections from searching the predicate results set that include predicated entity attributes for the real-world entity, and updating the anchor entity candidate to include one or more of the predicated entity attributes.

What is claimed is:

1. A method of disambiguating online social mentions of a real-world entity, the method including:
   selecting one or more core entity attributes that represent a real-world entity as a first search attribute set for use in searching biographical sources;
   receiving, responsive to searching the biographical sources based on the first search attribute set, entity reflections that include supplemental entity attributes for the real-world entity;
   using a combination of the selected core entity attributes and one or more supplemental entity attributes to define a second search attribute set that is narrower than the first search attribute set;
   receiving, responsive to searching further web sources based on the second search attribute set, more entity reflections that include meta entity attributes for the real-world entity; and
   updating the combination to include one or more of the meta entity attributes.

2. The method of claim 1, further including:
   selecting one or more meta entity attributes to combine with the second search attribute set to form a third search attribute set that is narrower than the second search attribute set;
   electronically receiving, responsive to the third search attribute set, additional entity reflections that include additional meta entity attributes; and
   updating the combination to include one or more of the additional meta entity attributes.

3. The method of claim 1, wherein at least some of the entity reflections represent one or more web mentions or web profiles of the real-world entity.

4. The method of claim 1, further including:
   using an entity profile from a primary biographical source that includes the core entity attributes selected as the first search attribute set used to search the biographical sources.

5. The method of claim 1, further including:
   generating a set of predicate results from one or more web crawls using predicate analysis based on affix schemas with predetermined context words before and after entity mentions;
   applying one or more of the first or second search attribute sets to search among the predicate results set;
   electronically receiving entity reflections from searching the predicate results set that include predicated entity attributes for the real-world entity; and
   updating the combination to include one or more of the predicated entity attributes.

6. The method of claim 1, further including applying one or more probability distribution functions or joint probability distribution functions to estimate resulting cohort size of entity reflections responsive to the first search attribute set.

7. The method of claim 1, further including applying one or more probability distribution functions or joint probability distribution functions to estimate resulting cohort size of entity reflections responsive to the second search attribute set.

8. The method of claim 1, further including applying one or more probability distribution functions or joint probability distribution functions to estimate resulting cohort size of entity reflections responsive to the first and second search attribute sets.

9. A method for creating a unique online social mention of a real-world entity from a plurality of online social mentions, the method including:
   selecting one or more core entity attributes that represent a real-world entity as a first search attribute set for searching biographical sources;
   electronically receiving, responsive to searching the biographical sources based on the first search attribute set, entity reflections that include supplemental entity attributes for the real-world entity;
   combining supplemental attributes having attributes scores above a predefined threshold with core attributes to define a second search attribute set;
   electronically receiving, responsive to searching further web sources based on the second search attribute set, more entity reflections that include meta entity attributes for the real-world entity; and
   updating the combination to include one or more of the meta entity attributes having attribute scores above the predefined threshold.

10. The method of claim 9, wherein attribute scores for the entity reflections specify a quantitative assessment of similarity between the attributes of the entity reflections and the core attributes.

11. The method of claim 9, wherein attribute scores for the more entity reflections specify a quantitative assessment of similarity between the attributes of the more entity reflections and a set of the core entity attributes and the supplemental entity attributes above the predefined threshold.

12. A system, including:
   one or more processors coupled to memory, the memory loaded with computer instructions that, when executed on the processors, implement actions including:
      selecting one or more core entity attributes that represent a real-world entity as a first search attribute set for use in searching biographical sources;
      receiving, responsive to searching the biographical sources based on the first search attribute set, entity reflections that include supplemental entity attributes for the real-world entity;
      using a combination of the selected core entity attributes and one or more supplemental entity attributes to define a second search attribute set that is narrower than the first search attribute set;
      receiving, responsive to searching further web sources based on the second search attribute set, more entity reflections that include meta entity attributes for the real-world entity; and
      updating the combination to include one or more of the meta entity attributes.

13. The system of claim 12, further configured to:
   select one or more meta entity attributes to combine with the second search attribute set to form a third search attribute set that is narrower than the second search attribute set;

electronically receive, responsive to the third search attribute set, additional entity reflections that include additional meta entity attributes; and update the combination to include one or more of the additional meta entity attributes.

14. The system of claim 12, further configured to:

generate a set of predicate results from one or more web crawls using predicate analysis based on affix schemas with predetermined context words before and after entity mentions;

apply one or more of the first or second search attribute sets to search among the predicate results set;

electronically receive entity reflections from searching the predicate results set that include predicated entity attributes for the real-world entity; and update the combination to include one or more of the predicated entity attributes.

15. The system of claim 12, further configured to apply one or more probability distribution functions or joint probability distribution functions to estimate resulting cohort size of entity reflections responsive to the first search attribute set.

16. The system of claim 12, further configured to apply one or more probability distribution functions or joint probability distribution functions to estimate resulting cohort size of entity reflections responsive to the second search attribute set.

17. The system of claim 12, further configured to apply one or more probability distribution functions or joint probability distribution functions to estimate resulting cohort size of entity reflections responsive to the first and second search attribute sets.

18. A system, including:

one or more processors coupled to memory, the memory loaded with computer instructions that, when executed on the processors, implement actions including:

selecting one or more core entity attributes that represent a real-world entity as a first search attribute set for searching biographical sources;

electronically receiving, responsive to searching the biographical sources based on the first search attribute set, entity reflections that include supplemental entity attributes for the real-world entity;

combining supplemental attributes having attributes scores above a predefined threshold with core attributes to define a second search attribute set;

electronically receiving, responsive to searching further web sources based on the second search attribute set, more entity reflections that include meta entity attributes for the real-world entity; and updating the combination to include one or more of the meta entity attributes having attribute scores above the predefined threshold.

19. A non-transitory computer readable medium storing a plurality of instructions for programming one or more processors to identify entity mentions referencing a same real-world entity, the instructions, when executed on the processors, implementing actions including:

selecting one or more core entity attributes that represent a real-world entity as a first search attribute set for use in searching biographical sources, including in the selection applying one or more probability distribution functions or joint probability distribution functions to estimate resulting cohort size;

generating one or more searches for processing by a plurality of biographical sources using the first search attribute set;

electronically receiving, responsive to the first search attribute set, entity reflections that include supplemental entity attributes for the real-world entity;

selecting one or more extended entity attributes as a second search attribute set for use in searching web sources, including applying one or more further probability distribution functions or joint probability distribution functions to estimate resulting cohort size;

generating one or more further web searches using the second search attribute set;

electronically receiving, responsive to the second search attribute set, more entity reflections that include meta entity attributes for the real-world entity; and updating the anchor entity candidate to include one or more of the meta entity attributes.

20. A non-transitory computer readable medium storing a plurality of instructions for programming one or more processors to connect entity reflections to real-world entities in an ambiguous environment, the instructions, when executed on the processors, implementing actions including:

selecting one or more core entity attributes that represent a real-world entity as a first search attribute set for use in searching biographical sources, including in the selection applying one or more probability distribution functions or joint probability distribution functions to estimate resulting cohort size;

generating one or more searches for processing by a plurality of biographical sources using the first search attribute set;

electronically receiving, responsive to the first search attribute set, entity reflections that include supplemental entity attributes for the real-world entity;

calculating attribute scores for supplemental attributes using a probability contribution function, wherein the attribute scores specify a quantitative assessment of similarity between the supplemental attributes and the core attributes;

merging supplemental attributes with attributes scores above a predefined threshold with core attributes in an anchor entity candidate data object with extended entity attributes that represent the real-world entity;

selecting one or more extended entity attributes as a second search attribute set for use in searching web sources, including applying one or more further probability distribution functions or joint probability distribution functions to estimate resulting cohort size;

electronically receiving, responsive to the second search attribute set, more entity reflections that include meta entity attributes for the real-world entity;

calculating attribute scores for meta entity attributes using a probability contribution function, wherein the attribute scores specify a quantitative assessment of similarity between the meta entity attributes and the extended entity attributes; and updating the anchor entity candidate to include one or more of the meta entity attributes with attribute scores above the predefined threshold.

* * * * *